United States Patent [19]
Boden et al.

[11] Patent Number: 5,093,084
[45] Date of Patent: Mar. 3, 1992

[54] APPARATUS FOR THE CONTINUOUS PREPARATION OF A LIQUID REACTION MIXTURE FROM TWO FLUID REACTANTS

[75] Inventors: Heinrich Boden; Bernhard Rentz; Heinrich Ersfeld; Klaus Nadolski, all of Leverkusen, Fed. Rep. of Germany

[73] Assignee: Bayer Aktiengesellschaft, Leverkusen, Fed. Rep. of Germany

[21] Appl. No.: 506,728

[22] Filed: Apr. 9, 1990

Related U.S. Application Data

[63] Continuation-in-part of Ser. No. 92,723, Sep. 3, 1987, abandoned.

[30] Foreign Application Priority Data

Sep. 19, 1986 [DE] Fed. Rep. of Germany ....... 3631898
Oct. 1, 1986 [DE] Fed. Rep. of Germany ....... 3633343

[51] Int. Cl.<sup>5</sup> ............................. B01F 5/02; B01F 5/04
[52] U.S. Cl. .................................... 422/133; 366/173; 366/174; 422/129; 422/224

[58] Field of Search ................... 366/171–174, 366/167, 150, 177; 422/133, 129, 224

[56] References Cited

U.S. PATENT DOCUMENTS 4,068,829 1/1978 Laurent et al. ...................... 366/177
4,239,732 12/1980 Schneider ............................ 422/133

FOREIGN PATENT DOCUMENTS 2145547 3/1973 Fed. Rep. of Germany .

Primary Examiner—Robert J. Warden
Assistant Examiner—Amalia L. Santiago
Attorney, Agent, or Firm—Joseph C. Gil

[57] ABSTRACT

The present invention is directed to a process and apparatus for production liquid reaction mixtures. The invention includes a mix head with a mixing chamber which receives reactants through nozzle openings. The key feature resides in placing an impingement surface between at least one of the nozzle openings of the mix head and the mixing chamber itself.

6 Claims, 4 Drawing Sheets

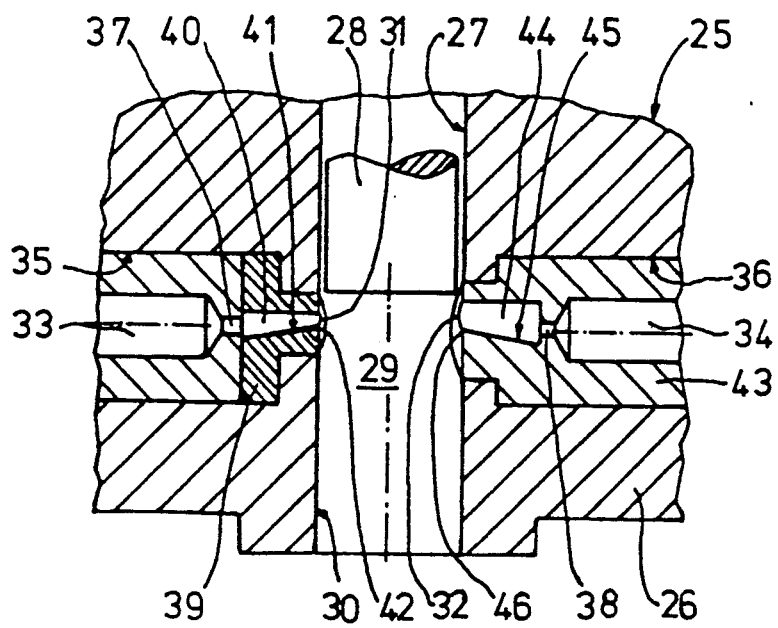
FIG. 2
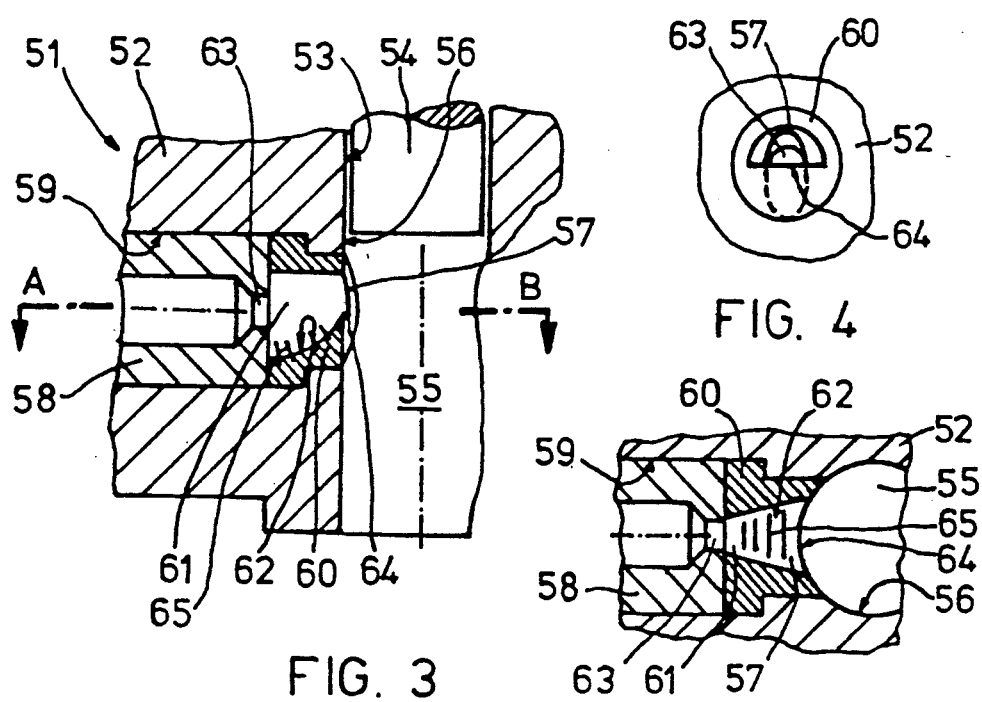
FIG. 3
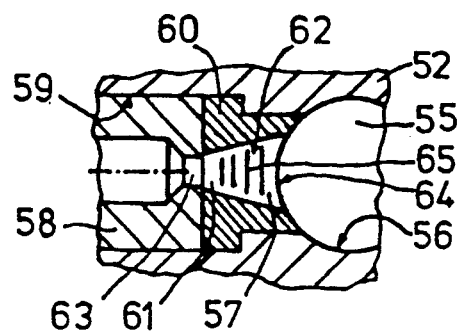
FIG. 4
FIG. 5

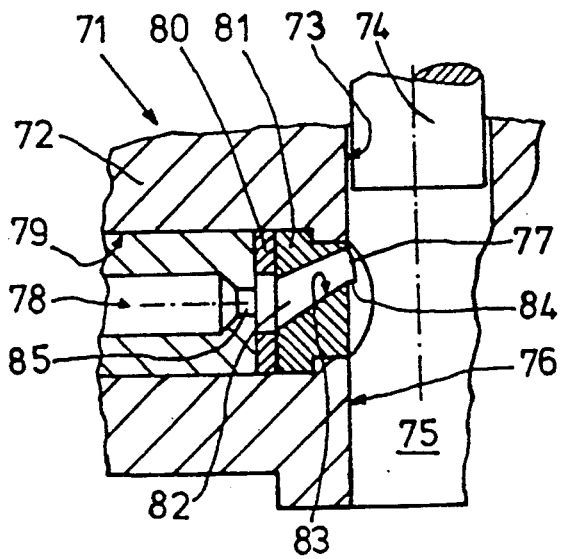
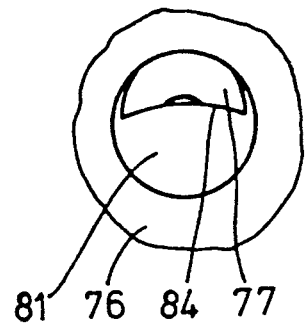
FIG. 6  FIG. 7
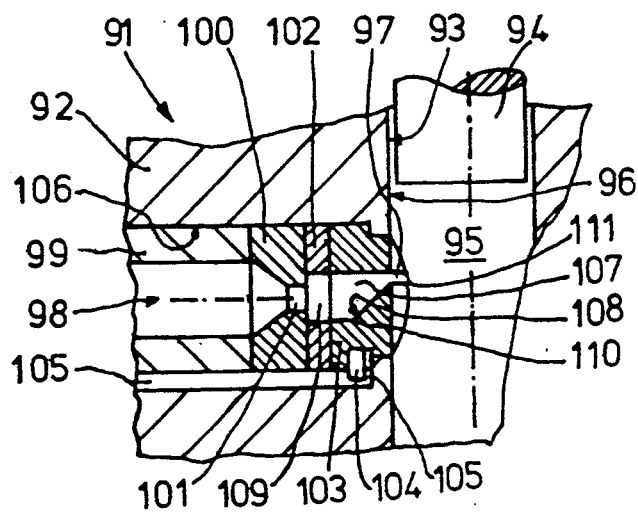
FIG. 8
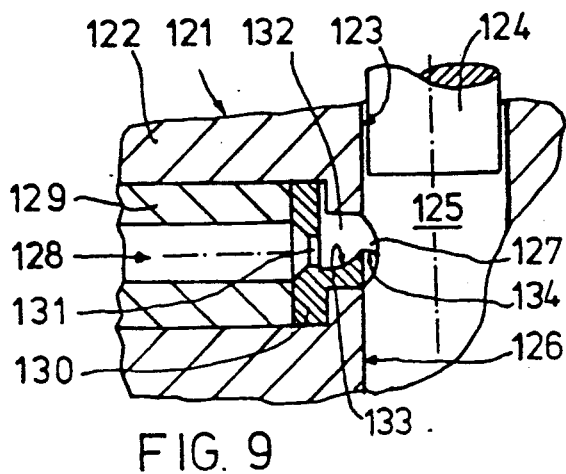
FIG. 9

APPARATUS FOR THE CONTINUOUS PREPARATION OF A LIQUID REACTION MIXTURE FROM TWO FLUID REACTANTS

CROSS-REFERENCE TO RELATED APPLICATION

This application is a continuation-in-part of U.S. application Ser. No. 092,723, filed on Sept. 3, 1987 now abandoned.

BACKGROUND OF THE INVENTION

This invention relates to a process and an apparatus for the preparation of a liquid reaction mixture which forms a plastic (and preferably a micro-cellular or a foam product) from at least two liquid reactants which are injected in measured quantities into a mixing zone from which the resulting reaction mixture is discharged and which mixing zone is subsequently cleaned.

The process described above is one of several variations of the so-called RIM technique (reaction injection molding) in which the components are injected into a mixing zone at high injection pressures through perforated nozzles or needle closure nozzles to ensure adequate mixing. Thorough mixing becomes increasingly difficult with increasing viscosity of the components. When relatively small total quantities are passed through at high flow rates so that the dosing times are very short (sometimes even less than 1 second), problems at the beginning and end of the flow and insufficient uniform mixing result in faults in the finished product. The injection pressures have therefore been raised to above 200 bar in order to widen out the jet and obtain a fine distribution of droplets. This, however, puts a great strain on the dosing pumps. There is also a risk of the pipes bursting. The nozzle openings must be kept extremely small which causes blockages if the components contain fillers. It has therefore been attempted to overcome these disadvantages by heating the components in order to lower their viscosity. This, however, reduces the storage stability in some components and also increases the required energy consumption and the reactivity. Although some improvement in the thoroughness of mixing may be obtained by after-mixing, this does not solve the problems at the beginning and end of the run. Moreover, after-mixing results in material losses and cleaning problems arise in the working up of the so-called internal release systems.

To date, it has not been possible to make use of the recognized advantages of the RIM technique (namely simplicity of construction of the mixing head, self-cleaning of the mixing chamber, simplicity of control and efficient long-term use) and at the same time solve the existing problems of obtaining a uniform mixture and complete adherence to a given formulation from the first drop of reaction mixture to the last as it enters a mold cavity, to thus produce flawless finished products, possibly without any gating losses. These problems are particularly difficult if the reactants are comparatively viscous.

The problem arises of improving the so-called RIM technique so that the advantages described above can be combined with homogeneous mixing and complete accuracy of the formulation over the whole mixing process even at reduced injection pressures in order to meet present-day demands for quality in the parts to be produced.

BRIEF DESCRIPTION OF THE DRAWINGS

FIG. 2 is a section taken through a first embodiment of the mix head of the apparatus, FIG. 3 is a section taken through a second embodiment of the mix head, FIG. 4 is an end-on view of one of the inlet openings of the mix head of FIG. 3 into the mixing chamber, FIG. 5 is a section taken on the line A—B of FIG. 3, FIG. 6 is a section taken through a third embodiment of the mix head, FIG. 7 is an end view of one of the inlet openings of the mix head of FIG. 6 into the mixing chamber, FIG. 8 is a section through a fourth embodiment of the mix head, FIG. 9 is a section through a fifth embodiment of the mix head and FIG. 10 is a section through a sixth embodiment of the mix head.

DESCRIPTION OF THE INVENTION

Figure 1:
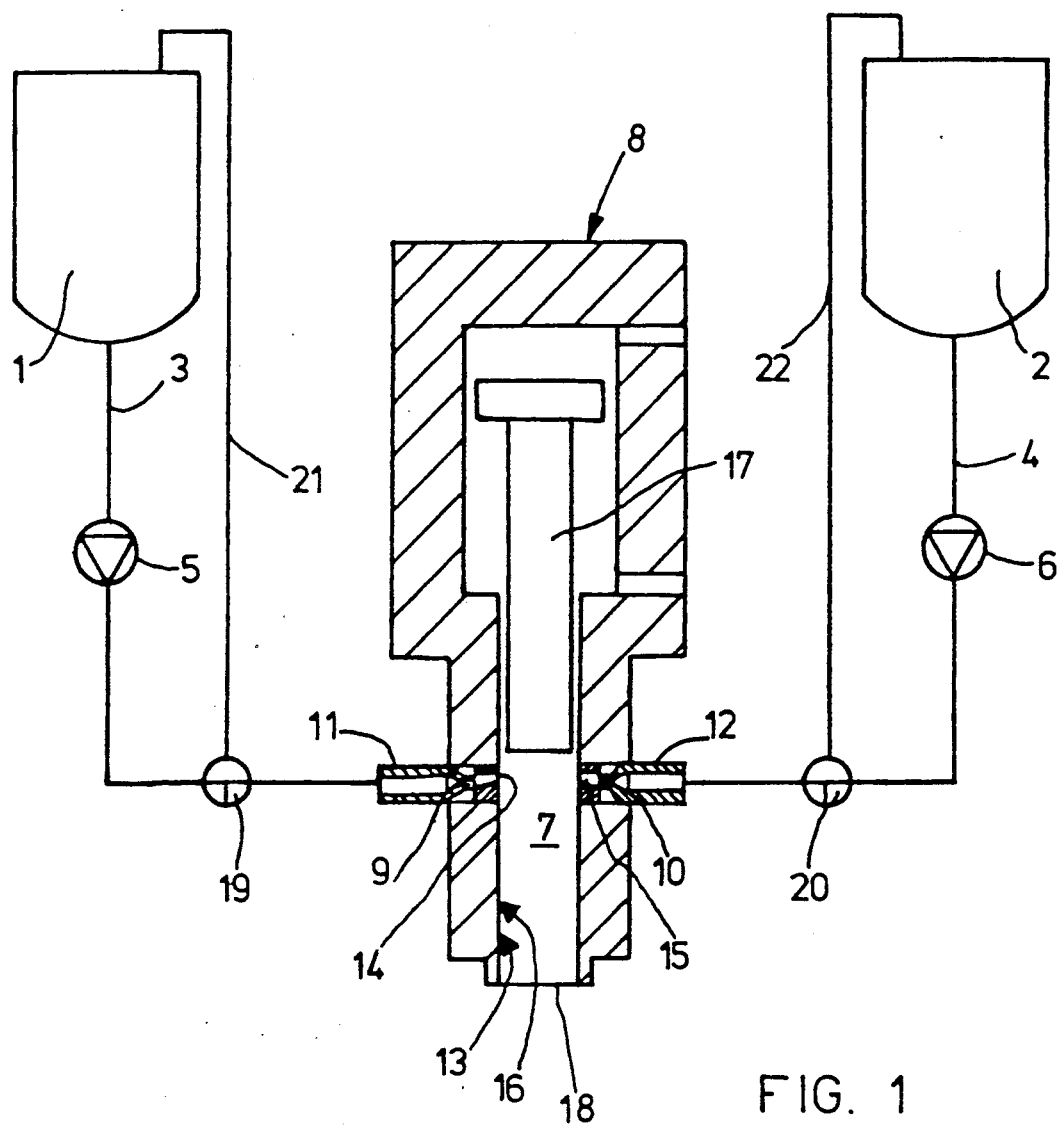
FIG. 1 is a diagram of the overall apparatus.

The above problems are solved by deflecting and thereby widening at least one of the component jets after it has passed through the narrowest flow cross-section but before it enters the mixing zone. The component jet thus strikes against an impingement surface almost immediately on its exit from the nozzle opening (which is generally the location of the narrowest nozzle cross-section). Due to the angle at which the impingement surface is set the jet partly flows back into itself so that the formation of very fine droplets is promoted. The component jet already spreads out somewhat when it is deflected. This increase in width continues along the path of the jet into the mixing chamber. Of course, the degree to which the jet opens out depends on the injection pressure, the viscosity of the components, the angle of incidence and the contours of the impingement surface. It is particularly advantageous to deflect all the component jets. It may be advantageous to deflect them under differing conditions, for example at different angles. The jet is preferably deflected obliquely to the direction of outflow from the mixing zone.

Under these conditions, those components which were the first to be introduced at the beginning of the mixing process must penetrate the component jet on their journey to the mixing chamber so that some pre-mixing takes place. The last component parts to be introduced undergo pre-mixing with the immediately preceding component parts.

According to a further embodiment, the jet is carried over a sharp edge after it has been deflected. This procedure gives rise to an exceptionally thin jet which favors the formation of the finest droplets. It also promotes jets, especially at the beginning and end of the mixing process.

Each of these measures contributes to a widening out of the component jet and hence to thorough mixing so that the quality of mixing previously obtained at a given injection pressure can now be obtained at a lower injection pressure. Since lower injection pressures are now generally sufficient, it is possible to use nozzle openings with larger diameters, thereby reducing the risk of blockages, especially when working with components containing fillers.

The new process is particularly advantageous for self-cleaning mixing zones.

The apparatus of the present invention comprises:

(a) reservoirs for each of the reactants,
(b) feed pipes leading via dosing pumps from each of said reservoirs to nozzles for each reactant, whereby jets are formed by the reactants passing through said nozzles,
(c) each of said nozzles opening into a pre-chamber, said pre-chamber comprising:
   (i) an inlet opening, said inlet opening having a cross-section greater than the cross-section of the nozzle associated therewith,
   (ii) an outlet, said outlet opening into a mixing chamber of a mix head, said reaction mixture being formed in said mixing chamber, said mixing chamber having an outlet opening and optionally an ejector piston associated therewith, and
   (iii) an impingement surface located between said inlet opening and said outlet, said surface allowing said jet to impinge against it.

The apparatus is useful for the continuous preparation of a liquid reaction mixture forming a plastic and in particular a foam, from at least two liquid reactants supplied at a dosed rate. The keys to the present invention are the pre-chamber and the impingement surface arranged between at least one of the nozzle openings and the mixing chamber. The degree to which the impingement surface functions as a striking surface depends on its arrangement in relation to the position of the nozzle opening. It depends on the angle at which the impingement surface is set and on whether the impingement surface begins immediately at the nozzle opening or at some distance therefrom. Depending on the properties of the components to be injected, especially their viscosity, the choice of the one or other arrangement will afford the greater advantage. Preferably, each nozzle opening has an impingement surface associated with it and each of these surfaces will be specially adapted to the nature of the reactants ejected from the nozzle.

The impingement surface preferably ascends in a direction away from the outlet of the mixing chamber.

According to a further particular feature, the impingement surface has a sharp edge facing the mixing chamber. This sharp edge is preferably arranged transversely to the axis of the mixing chamber. If the mix head is equipped with an ejector and control piston, such a sharp edge has the advantage that the opening and closing of the inlet into the mixing chamber by the ejector piston is greatly facilitated and improved. Such an edge causes the deflected jet to be very flat on its entry into the mixing chamber so that the jet is broken off very abruptly when the inlet is closed. The ejector piston may, of course, be designed also to function as control piston in known manner. If no ejector piston is provided, then the mixing chamber must be rinsed.

According to another embodiment, the impingement surface is contoured. Various forms of contours are possible. The surface may have a convex or concave curvature. It may form an open channel which increases or decreases in width in the direction towards the mixing chamber. It may have fine grooves extending along, transversely to or obliquely to the impingement surface. It may have tiny elevations formed by intersecting ridges. One or other form of contour or a combination of several may be the most advantageous, depending on the properties of the components to be injected.

According to a first embodiment, the impingement surface is arranged directly in the nozzle body of an injection nozzle. This embodiment has the advantage of being in a single part but it has the disadvantage that if a differently formed impingement surface is required or the surface is required to be set at a different distance from the nozzle opening then the entire unit has to be replaced. As an alternative, therefore, the impingement surface can be arranged in an insert attachment. This embodiment has the advantage that so long as the same injection nozzle is used, only the insert need be exchanged.

Another embodiment is characterized by a common insert member for all impingement surfaces with the insert member containing the mixing chamber. This has the advantage that the complete insert is exchangeable. The injection nozzles may be housed in the mix head housing independently of this insert although the insert member preferably has recesses in which the injection nozzles are replaceably mounted. It is therefore possible to use a different common insert member with the same injection nozzles or to combine the same insert member with different injection nozzles. The latter is advantageous if different nozzle cross-sections are required due to the specific properties of the different component streams.

The use of a common insert member has the special advantage that the fixed positions of all the critical distances to one another obviates the need for any special adjustment work. This avoids problems at the beginning and end of the flow when the insert openings are opened and closed by an ejector and control piston. This embodiment has the further advantage that the distance between the impingement surface and the nozzle opening is adjustable. This adjustability can easily be obtained by inserting spacer rings of suitable thickness between the injection nozzle and the insert. The injection nozzle may be mounted displaceably so that the distance to the impingement surface can be adjusted by displacing the nozzle. This would, of course, be complicated to construct.

The injection nozzles may be mounted in a sphere or spherical segment so that the angle between the axis of the injection nozzle and the impingement surface can be adjusted. This embodiment is also very complicated and would only be used for very special cases.

The impingement surface has a counter surface with which it cooperates to form a defined inlet gap into the mixing chamber. This inlet gap has, of course, a larger cross-section than the nozzle opening.

Several embodiments of the new apparatus are described below and illustrated purely schematically in the drawings.

In FIG. 1, supply pipes 3,4 extend from a reservoir 1 for polyol and a reservoir 2 for isocyanate to the mixing chamber 7 of a schematically indicated mixing head 8 via dosing pumps 5,6. The pipes 3,4 open into injection nozzles 11,12 which have nozzle openings 9,10. The nozzle openings 9,10 communicate with the mixing chamber 7 through the inlet openings 14,15 which are arranged in the wall 13 of the mixing chamber. The mixing chamber 7 forms part of a guide bore 16 for an ejector piston 17 which is pushed forwards after the mixing process so that it ejects any residue of mixture left in the mixing chamber 7 and fills the mixing chamber 7 as far as the outlet opening 18. The feed pipes 3, 4 contain reversing valves 19, 20 just before the mix head 8, and return ducts 21, 22 extend from these valves to the reservoirs 1, 2. Subsequent Figures show enlarged views of various embodiments of the mix head 8.

In FIG. 2, the mix head 25 consists of a housing 26 containing a guide bore 27 for an ejector piston 28. In the position illustrated, the ejector piston 28 exposes a mixing chamber 29 and the inlet apertures 31, 32 situated in the wall 30 of the mixing chamber 29. Feed pipes (not shown) for the reactants open into injection nozzles 33, 34 which are arranged in housing bores 35, 36 and have nozzle openings 37, 38. An insert member 39 is arranged between the injection nozzle 33 and mixing chamber 29 and is secured against rotation. It has a pre-chamber 40, the bottom of which forms an impingement surface 41 which begins at the lower edge of the nozzle opening 37 and rises at an angle of 10° to the axis of the injection nozzle 33 so that the mixed jet emerging from the nozzle mainly strikes the impingement surface 41. At its end near the mixing chamber 29, the insert member 39 is adapted to the shape of the wall 30 of the chamber 29. At this end, the impingement surface 41 forms a sharp cut-off edge 42 extending transversely to the axis of the mixing chamber 29. The injection nozzle 34 is formed by a nozzle body 43 which extends beyond the nozzle opening 38. Inside this extension is a pre-chamber 44 the bottom of which again forms a impingement surface 45. This impingement surface 45 begins about 1 mm below the nozzle opening 38 so that the jet emerging from the nozzle opening strikes obliquely against the impingement surface 45 which is set at an angle of 10° and the jet is deflected upwardly. The impingement surface 45 ends at the mixing chamber 29 in a sharp cut-off edge 46 which forms part of the boundary to the inlet opening 32.

In FIGS. 3 to 5, the mix head 51 has a housing 52 containing a guide bore 53 for an ejector piston 54. In the position illustrated, the ejector piston 54 exposes the mixing chamber 55 and the inlet opening 57 which is situated in the wall 56 of the mixing chamber 55. For simplicity, the drawing shows only one injection nozzle 58 supplied by a feed pipe (not shown). The injection nozzle 58 is seated in a housing bore 59. An insert member 60 is provided between the injection nozzle 58 and the mixing chamber 55. This insert 60 has a pre-chamber 61 the bottom of which forms a impingement surface 62. This impingement surface 62 begins somewhat below the nozzle opening 63 and is in the form of a trough which flattens as it ascends to the inlet opening 57 in the mixing chamber wall 56 where it forms a sharp cut-off edge 64 which extends transversely to the axis of the mixing chamber 55. The impingement surface 62 has a contour 65 in the form of transverse ridges 0.3 mm in depth.

In FIGS. 6 and 7, the mix head 71 consists of a housing 72 containing a guide bore 73 for an ejector piston 74. In the position illustrated, the ejector piston 74 exposes the mixing chamber 75 and the inlet opening 77 in the wall 76 of the mixing chamber 75. For simplicity, the drawing shows only one injection nozzle 78 into which a feed pipe (not shown) opens. The injection nozzle 78 is seated in a housing bore 79. A perforated spacer disc 80 and an insert 81 are situated between the injection nozzle 78 and the mixing chamber 75 and secured against rotation. The insert has an obliquely ascending pre-chamber 82 the bottom of which forms an impingement surface 83. This impingement surface 83 begins somewhat below the nozzle opening 85, is convexly curved and ends in a sharp edge 84 in the inlet opening 77.

In FIG. 8, the mix head 91 consists of a housing 92 containing a guide bore 93 for an ejector piston 94. In the position illustrated, the ejector piston 94 exposes the mixing chamber 95 and the inlet opening 97 in the wall 96. For simplicity, only the injection nozzle 98 is shown in the drawing. A similar nozzle would be situated on the other side of the axis bilaterally symmetrical to the first. A feed pipe (not shown) opens into the injection nozzle 98. The injection nozzle 98 consists of the nozzle body 99 and a perforated end piece 100 with nozzle opening 101. A spacer disc 102 and an insert member 103 are arranged between the perforated end piece 100 and the mixing chamber 95. This insert 103 has a pin 104 fitting into a groove 105 to prevent rotation of the insert 103. All these parts are accommodated in a housing bore 106. The insert 103 has a pre-chamber 107 the bottom of which forms an impingement surface 108. This impingement surface 108 begins at the lower edge of the perforation 109 in the spacer disc 102 and is therefore at a lower level than the bottom edge of the nozzle opening 101. The impingement surface 108 rises to the mixing chamber 95 and has a kink 110 beyond which it rises more steeply. Due to the presence of a counter-surface 112, the inlet opening 97 in this case has the form of a narrow inlet gap extending transversely to the axis of the mixing chamber 95. The lower boundary of this gap forms a sharp edge 111.

In FIG. 9, the mix head 121 consists of a housing 122 containing a guide bore 123 for an ejector piston 124. In the position illustrated, the ejector piston 124 exposes the mixing chamber 125 and the inlet opening 127 situated in the wall 126 of the mixing chamber 125. For simplicity, the drawing shows only one of the two axially opposite injection nozzles 128 into which a feed pipe (not shown) opens. The injection nozzle 128 comprises a nozzle body 129 and a perforated end piece which forms a single unit with an insert 130. This insert 130 has a nozzle opening 131 with an adjacent pre-chamber 132 which leads to the inlet opening 127. The bottom of this chamber forms an impingement surface 133 which begins at the lower edge of the injection nozzle 131 and rises in the form of an arc to the inlet opening 127. The lower edge is again a sharp cut-off edge 134.

Figure 10:
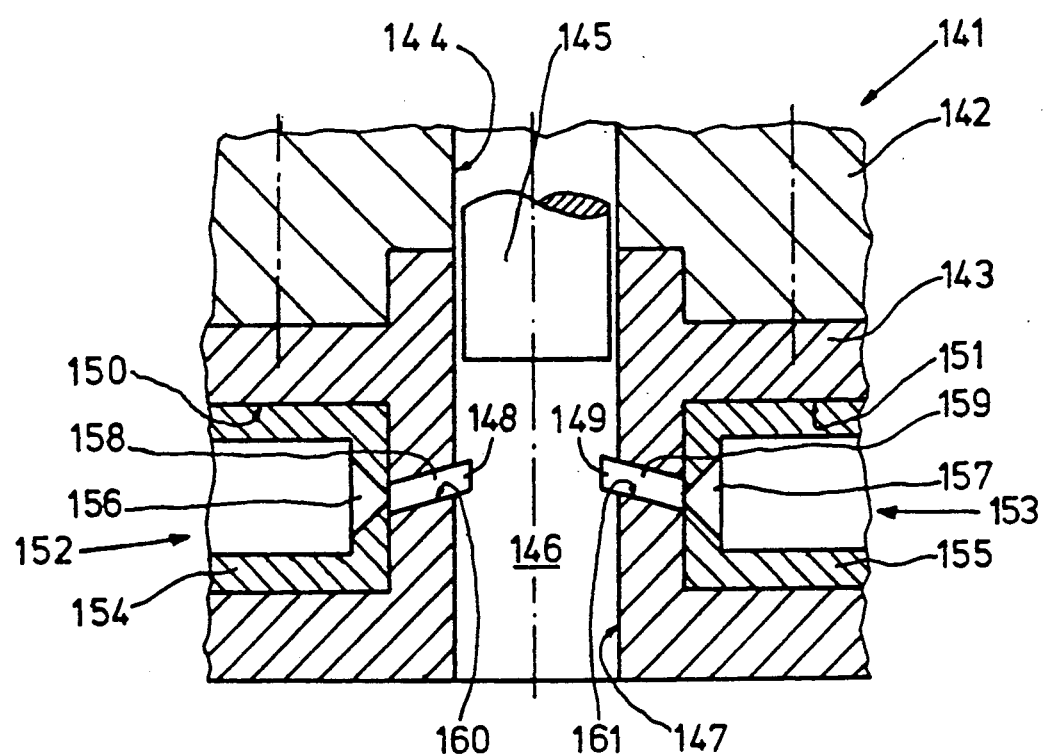

In FIG. 10, the mix head 141 consists of a housing 142 to which an insert 143 is flange connected. This insert is bilaterally symmetric with respect to the mid axis. A guide bore 144 provided for an ejector piston 145 in the housing 142 is prolonged in the axial direction to extend through the insert member 143 in which it forms a mixing chamber 146 when the ejector piston 145 exposes the inlet openings 148, 149 situated in the wall 147 of the mixing chamber 146. The insert 143 is a common part for all the injection openings 148, 149 and has recesses 150, 151 in which injection nozzles 152, 153 are replaceably mounted. Feed pipes (not shown) lead into these injection nozzles. The injection nozzles 152, 153 consist of nozzle bodies 154, 155 with nozzle openings 156, 157. The insert 143 has pre-chambers 158, 159 arranged between the nozzle openings 156, 157 and the inlet openings 148, 149. The bottom of each of these chambers 158, 159 forms an impingement surface 160, 161.

What is claimed is:

1. An apparatus for the preparation of a liquid reaction mixture from at least two liquid reactants comprising:
   (a) reservoirs for each of the reactants,
   (b) feed pipes leading via dosing pumps from each of said reservoirs to nozzle for each reactant, whereby jets are formed by the reactants passing through said nozzles, (c) each of said nozzles opening into a respective pre-chamber, each of said pre-chambers comprising:

(i) an inlet opening, said inlet opening having a cross-section greater than the cross-section of the nozzle associated therewith, (ii) an outlet, said outlet opening into a mixing chamber, said reaction mixture being formed in said mixing chamber, said mixing chamber having an outlet opening, and (iii) an impingement surface located between said inlet opening and said outlet of said pre-chamber, said impingement surface allowing said jet to impinge against it.

2. The apparatus of claim 1, wherein the impingement surface ascends in the direction away from the outlet opening of the mixing chamber.

3. The apparatus of claim 1, wherein the impingement surface has a sharp cut-off edge facing the mixing chamber.

4. The apparatus of claim 1, wherein the impingement surface is contoured.

5. The apparatus of claim 1, wherein the impingement surface is arranged in an insert member.

6. The apparatus of claim 5, characterized by a common insert member for all the impingement surfaces, the said insert member containing the mixing chamber.

* * * * *